United States Patent
Rajalingam et al.

(12) 
(10) Patent No.: US 6,271,305 B1
(45) Date of Patent: Aug. 7, 2001

(54) BITUMINOUS POLYURETHANE INTERPENETRATING ELASTOMERIC NETWORK COMPOSITIONS AS COATINGS AND SEALANTS FOR ROOFING AND OTHER APPLICATIONS

(75) Inventors: Ponswamy Rajalingam; Umarani Rajalingam, both of Pompano Beach, FL (US)

(73) Assignee: Urecoats Technologies, Inc., Pompano Beach, FL (US)

( * ) Notice: Subject to any disclaimer, the term of this patent is extended or adjusted under 35 U.S.C. 154(b) by 0 days.

(21) Appl. No.: 09/377,093

(22) Filed: Aug. 19, 1999

Related U.S. Application Data

(60) Provisional application No. 60/097,158, filed on Aug. 19, 1998.

(51) Int. Cl.[7] .................................................. C08L 95/00
(52) U.S. Cl. ........................... 524/705; 524/59; 427/138; 427/421; 427/422
(58) Field of Search ................... 524/59, 705; 427/138, 427/421, 422

(56) References Cited

U.S. PATENT DOCUMENTS

| | | | |
|---|---|---|---|
| 3,179,610 | * | 4/1965 | Wood .................................... 524/705 |
| 3,637,558 | * | 1/1972 | Verdol et al. ......................... 524/705 |
| 3,645,945 | * | 2/1972 | Lesesne et al. ...................... 524/705 |
| 3,835,077 | * | 9/1974 | Mori et al. ........................... 524/705 |
| 3,880,789 | * | 4/1975 | Ishihara et al. ...................... 524/705 |
| 4,195,009 | * | 3/1980 | Zimmermann ........................ 524/705 |
| 4,443,578 | * | 4/1984 | Frier ..................................... 524/705 |
| 5,045,590 | * | 9/1991 | Motumura et al. ................... 524/705 |
| 5,077,349 | * | 12/1991 | Fehlbier et al. ....................... 524/705 |
| 5,714,563 | * | 2/1998 | DePompei et al. ................... 524/705 |

FOREIGN PATENT DOCUMENTS

| | | | |
|---|---|---|---|
| 753865 | * | 1/1971 | (BE) ..................................... 524/705 |
| 2554864 | * | 6/1976 | (DE) ..................................... 524/705 |
| 0 219 399 | * | 4/1987 | (EP) ..................................... 524/705 |
| 1323884 | * | 7/1973 | (GB) ..................................... 524/705 |
| 13981 | * | 4/1972 | (JP) ..................................... 524/705 |
| 10337 | * | 1/1979 | (JP) ..................................... 524/705 |
| 98259 | * | 8/1981 | (JP) ..................................... 524/705 |
| 126125 | * | 6/1986 | (JP) ..................................... 524/705 |
| 174282 | * | 8/1986 | (JP) ..................................... 524/705 |
| 53371 | * | 3/1987 | (JP) ..................................... 524/705 |
| 587725 | * | 1/1980 | (RU) ..................................... 524/705 |

\* cited by examiner

*Primary Examiner*—Peter Szekely
(74) *Attorney, Agent, or Firm*—Malin, Haley & DiMaggio, P.A.

(57) ABSTRACT

The elastomeric polyurethane interpenetrating network compositions of the invention are developed by in situ reaction of polyols with different isocyanates and polyisocyanates in bituminous material. Suitable bituminous materials include asphalt, coal tar, polymer modified asphalt, oxidized, and unoxidized asphalt. The composition is preferably formed at a temperature between 200° F. and 350° F. The reaction kinetics can be accelerated by including catalysts and curing agents.

The reaction kinetics were followed by measuring the torque increase as a function of reaction time. The gelation time is measured at the maximum torque. For testing, the bituminous polyurethane interpenetrating network elastomeric compositions were hot-sprayed-applied (200° F.–350° F.) on different substrates such as concrete, metal, wood, built-up roofing systems, polyurethane foams, and other construction materials with a specially designed spray applicator system. The coated substrates were evaluated for their physical and mechanical properties, adhesion, static and dynamic puncture resistance, wind-up lift test, and other properties. Bituminous polyurethane interpenetrating network elastomer compositions of the invention are resistance to solvents, oil, and acid. Bituminous polyurethane interpenetrating network elastomers are suitable for a wide variety of applications including but not limited to roofing, new construction, and wall and foundation waterproofing applications.

25 Claims, 6 Drawing Sheets

Gelation Reaction Kinetics
Using Different Bituminous Materials

| Bitumunious Material | Gelation Time (sec) |
|---|---|
| Built up Roof Grade Asphalt | |
| Type I (PIN 37 AT 25°C) | 40 |
| Type II (PIN 23 AT 25°C) | 60 |
| Type III (PIN 18 AT 25°C) | 20 |
| Type IV (PIN 16 AT 25°C) | 45 |
| Coal Tar | 35 |
| Performance Grade Asphalt | |
| PG 70/28 (PIN 65 AT 25°C) | 60 |
| PG 64/28 (PIN 75 AT 25°C) | 50 |
| PG 58/28 (PIN 105 AT 25°C) | 105 |
| PG 52/34 (PIN 195 AT 25°C) | semi gelation |

Experiments were run at 250°F, and mixed at 200 RPM

Gelation Kinetics of Asphalt-Polyurethane IPN Formation

| Variation of Components | Asphalt | Polyol Blend | Curative | Catalyst | Iso | Induction Time | Gelation Time |
|---|---|---|---|---|---|---|---|
| 1. Preferred Embodiment | 50% | 36% | 4% | Trace | 10% | Instantaneous | 50 sec |
| 2. Effect of Catalyst | 50% | 36% | 4% | Nil | 10% | 60 sec | 210 sec partial gelation |
| 3. a) Absence of Curative | 50% | 40% | Nil | Trace | 10% | 180 sec | 255 sec |
| b) Role of Curative % | 50% | 34% | 6% | Trace | 10% | | partial gelation |
| b) Role of Curative % | 50% | 38% | 2% | Trace | 10% | 165 sec | 375 sec |
| 4. Absence of Curative and Catalyst | 50% | 40% | Nil | Nil | 10% | 420 sec | 495 sec |
| 5. a) Effect of Asphalt | 25% | 36% | 4% | Trace | 10% | Instantaneous | 30 sec |
| b) Effect of Asphalt | 75% | 36% | 4% | Trace | 10% | | 375 sec partial gelation |
| c) Effect of Asphalt | Nil | 72 % | 8% | Trace | 20% | | 60 sec partial gelation |
| d) Effect of Asphalt* | Nil | 72% | 8% | Trace | 20% | Instantaneous | 15 sec |
| 6. Variation of Iso % | 50% | 37% | 4% | Trace | 9% | | 40 sec partial gelation |

Temperature: 250 ± 3F
Stirring: 200 RPM
Percentage of Composition (%) by Weight
* Temperature = 100 ± 3F

Fig. 3

Gelation Reaction Kinetics Using Different Curing Agents

| Supplier | Curing Agent Tradename | Curing Agent Generic Name and CAS No. | Gelation Time (sec) |
|---|---|---|---|
| Albermarle | Ethacure-100 | Diethyltoluenediamine 68479-98-1 | Instantaneous |
| Albermarle | Ethacure-300 | Di-(methylthio)toluenediamine 106264-79-3 | 60 |
| Huntsman | Jeffamine-400 | Poly(oxy(methyl-1,2,-ethanedily), alpha-hydro-omega-(2-aminomethylethoxy)-ether with 2-ethyl-2-(hydroxymethyl)-1,3-propanediol (3:1) 39423-51-3 | 100 |
| DuPont | Hexamethylene Diamine | Hexamethylenediamine(-1,6-Hexanediamine) | 10 |
| DuPont | Trimethylol Propane | Trimethylolpropane 77-99-6 | Incomplete Gelation |

*Fig. 4*

Most Preferred Methods and Materials

| Materials | Specifications | Suppliers |
|---|---|---|
| Rubberized Asphalt | 30 Pin | Bitumer Inc., Montreal, Canada |
| Polyether Polyol | MW = 1000<br>d @ 25°C = 0.97 g/cm<br>Functionality = 2.00 | BASF Corporation, Mount Olive, New Jersey, USA |
| Polymeric MDI | Functionality = 1.2<br>d @ 25°C = 1.22<br>NCO Content = 32%wt (CAS No. 9016-87-9) | BASF Corporation, Mount Olive, New Jersey, USA |
| Curing Agent | Mixture of 3,5-dimethylthio-2,6-toluenediamine & 3,5-dimethylthio-2,4-toluenediamine (CAS No. 106264-79-3) | Albermarle Corporation Louisiana, USA |
| Catalyst | Dibutyltin Dilaurate (CAS No. 77-58-7) | Air Products and Chemicals Allentown, Pennsylvania |

Fig. 7

BITUMINOUS POLYURETHANE INTERPENETRATING ELASTOMERIC NETWORK COMPOSITIONS AS COATINGS AND SEALANTS FOR ROOFING AND OTHER APPLICATIONS

CROSS-REFERENCE TO RELATED APPLICATIONS

This application claims the benefit of U.S. Provisional Application No. 60/097,158 filed Aug. 19, 1998.

STATEMENT REGARDING FEDERALLY SPONSORED RESEARCH OR DEVELOPMENT

Not applicable.

BACKGROUND OF THE INVENTION

1. Field of the Invention

This invention relates to the in situ generation and incorporation of polyurethane prepolymers generated within a matrix of bituminous material such as asphalt. The resulting bituminous polyurethane interpenetrating elastomeric network compositions can be applied as coatings and sealants for roofing, coverings, and construction waterproofing applications, as well as other applications.

2. Description of Related Art

Polyurethanes are extensively used as coatings and sealants in housing, construction, furniture, and other industries. Polyurethane prepolymers are generally developed by reacting different polyols with di- or poly-isocyanates in varying ratios. FIG. 2 depicts a reaction between a polyol and diisocyanate. Polyurethanes are hard, water-resistant, slippery when wet, and tend to degenerate when exposed to ultra-violet light.

"Bituminous material" is meant to include bitumen, asphalt, coal tar, and performance-rated asphalt. Due to the low cost of bituminous material, its relatively high penetration value when applied to most porous surfaces, weather-resistant nature, and impermeability to water, bituminous material has traditionally been used as a main component of protective films, adhesive binders in asphalt emulsions (M. Lalanne and J. Serfass, U.S. Pat. No. 4,724,245), in blends used for paving and roofing, joint sealants, paints, and other end uses. Existing unreinforced bituminous materials tend to crack during normal seasonal thermal expansion. In addition, typical bituminous materials are difficult to apply and take a long time (days) to cure completely.

Attempts to provide a blend of a liquid, preferably an ambient-curable prepolymer, with bituminous material have been made (H. Lucke, U.S. Pat. No. 4,871,792). In the past, several methods were developed to increase the compatibility between the bituminous binder and polyurethanes, either by using a modified clay (R. J. Janoski, U.S. Pat. Nos. 5,421,876 and 5,319,008), or pre-treating the bituminous materials before mixing with polyurethane prepolymer (M. Shihadeh, U.S. Pat. No. 3,980,597).

Several attempts to develop a rubberized bituminous material using crumb rubber have also been made. Methods are available, reported, and in practice today. Crumb rubber from recycled car and truck tires improves wear resistance (D. W. Causyn and K. Thys, PCT Int. Appl. WO 9221820), lowers temperature fracture properties (G. R. Morrison and S. A. M. Hesp., J. Mater. Sci. 30(10), 2584 (1995) and A. Coomaraswamy, S. Manolis and S. Hesp., Am. Chem. Soc. Div. Fuel. Chem., 41(4), 1322 (1996)); and enhances coating performance and safety of the coated surface (M. Wm. Rouse, Rubber World, 212(2), 23 (1995)). Most of these applications are used in the paving industry, anti-skid mats for playgrounds, and running tracks (H. L. Draper, D. F. Levy, and D. W. Gagle, U.S. Pat. No. 3,547,674).

Apart from the use of crumb rubber, other polymers are used to modify asphalt (M. E. Labib, G. M. Memon, and B. H. Chollar, Prepr. Pap.—Am. Chem. Soc., Div. Fuel. Chem., 41(4), 1209 (1996), I. K. Negulescu and W. H. Daly, Annu. Tech. Conf., Soc. Plat. Eng. 54th (vol. 1), 1175 (1996). The thermoplastic nature of these existing polymer modified bituminous materials limits their coating and sealant applications.

These past attempts to incorporate a resin within a bituminous material have failed for a combination of reasons. First, polyurethanes and bituminous materials are not miscible because polyurethanes are polar, while bituminous materials are non-polar. Second, without more, the reaction rate between the reagents forming the polyurethane (polyol and isocyanate) is slow enough that the reagents separate from the bituminous material, polymerize, and form non-integrated, heterogenous products. These heterogenous products do not produce synergistic qualities such as increased strength and ease of application.

BRIEF SUMMARY OF THE INVENTION

Owing to the advantages of polymer modified bituminous materials, this invention is a further novel modification of bituminous materials with polyurethanes, by in situ generation of their prepolymers, so that the prepared bituminous polyurethane interpenetrating elastomeric network compositions will be stronger, easier to apply, and less expensive than the conventional mixing of polyurethane prepolymers with bituminous material. The mixing of polyurethane prepolymer with the rubberized bituminous material at the molecular level results from improved miscibility. In turn, improved miscibility improves the physical and mechanical properties of the coatings and sealants.

Suitable bituminous materials include asphalt, coal tar, polymer modified asphalt, oxidized, and unoxidized asphalt.

According to the method of the invention, the polyol and bituminous materials are mixed separately from the isocyanate. The polyol and molten bituminous material are more miscible than prepolymerized polyurethane and bituminous material. Next, a catalyst and curing agent can be added to either of the polyol or isocyanate. The polyol/bituminous material mixture is then mixed thoroughly with the isocyanate immediately before application. The catalyst causes the polyurethane to form rapidly (in as little as seconds) within the bituminous material to form an effectively-homogenous, three-dimensional matrix.

The properties of the resulting matrix can be controlled by changing the formulation. By increasing the proportion of cross-linking agents such as diisocyanate, the strength of the product is increased. By reducing the proportions of cross-linking agents, the flexibility of the materials can be increased. Increased strength is useful in applications such as building reinforcement. Increased flexibility is useful in applications such as coating a running track or manufacturing o-rings.

A curing agent can be added to decrease the time before a permanent matrix is formed. Curing agent can reduce the gelation time to as little as seconds. Reduced gelation time is useful to expedite the completion of jobs such as filling cracks and crevices. A curing agent can be omitted or limited in situations requiring a longer time before setting. A longer setting time can be desirable when the material is used as an adhesive and time is required to position the materials being adhered.

These materials were tested as coatings, sealants, and adhesives on a range of substrates. These materials can be generated at the job site, and are applied to various surfaces, through our uniquely designed pumping, metering, mixing, and spraying system.

The present invention achieves the additional advantages set forth below by providing a unique method of modifying polyurethanes into useful compositions which meet the essential requirements for coatings and sealants. The asphalt/bitumen components provide processability of the resultant coatings and sealants. The rubber component provides frictional and abrasion resistance as well as ultra-violet radiation resistance to the coatings and sealants. The unique method of producing these polymers yields easy applications as well as an overall decrease in the coating cost.

The bituminous polyurethane interpenetrating elastomeric network compositions produced have improved adhesion. The highly reactive urethane prepolymer gives better adhesion to different substrates.

Therefore, an object of the present invention is to provide a composition which is superior in providing coating and sealing over a substrate.

Another object of this invention is to provide a method of preparing such a composition at or near the site of application, easily and economically.

Another object of this invention is to provide a sealing and coating composition which provides superior traction performance.

In accordance with these and other objects which will become apparent hereinafter, the instant invention will now be described with particular reference to the accompanying drawing.

BRIEF DESCRIPTION OF THE FIGURE

FIG. 3 is a table summarizing a series of controlled experiments containing different formulations.

FIG. 4 is a table summarizing a series of controlled experiments utilizing different curing agents.

FIG. 7 is a table listing a most preferred embodiment of the composition at the time of filing.

DETAILED DESCRIPTION OF THE INVENTION

Figure 1:
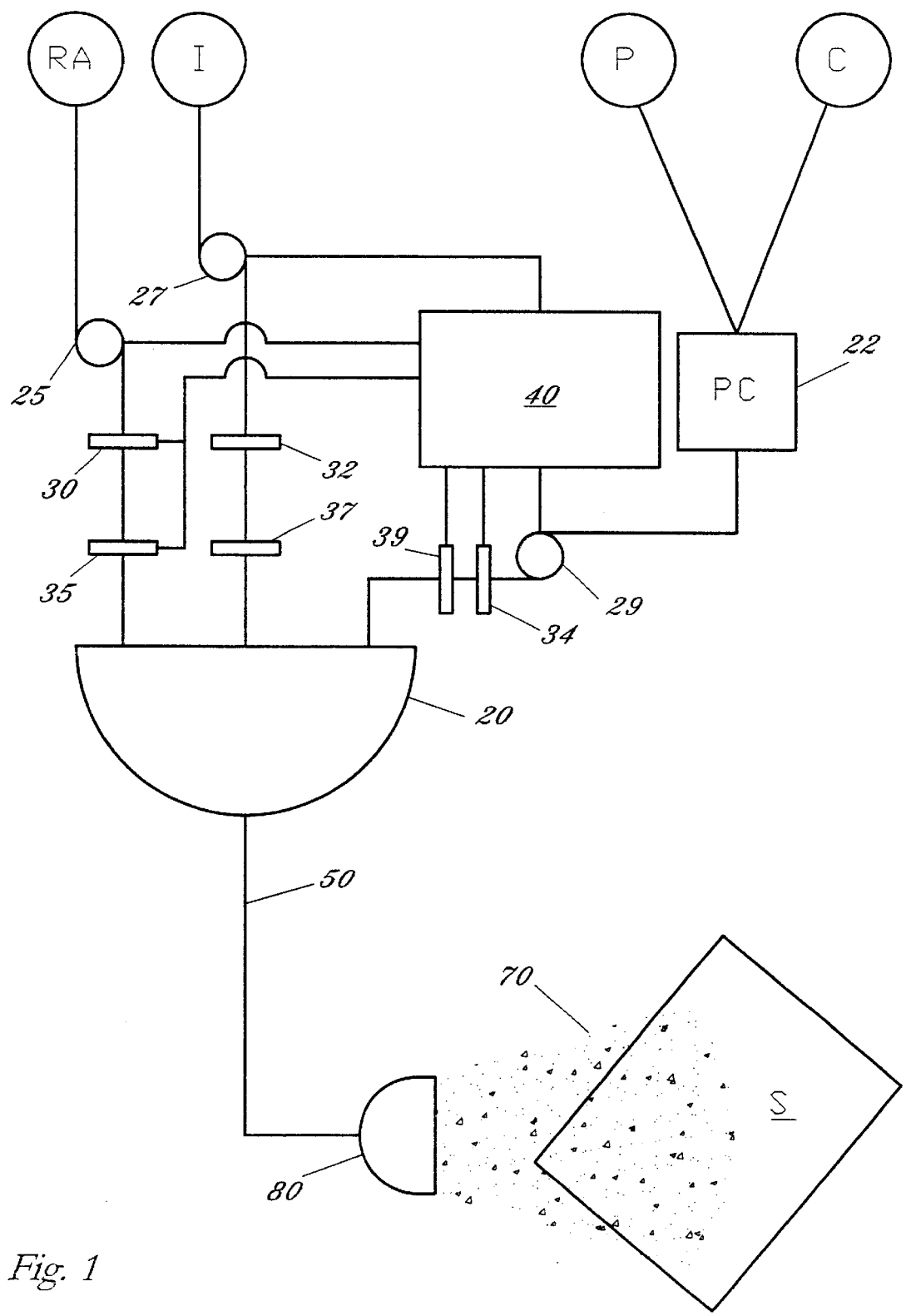
FIG. 1 is a schematic representation of the process of the instant invention.

Polyurethanes are widely used as coatings as well as sealant compounds because they adhere to a variety of substrates, resist scratching, and resist moisture. However, their uses are limited due to the high cost associated with application, degradation caused by ultra-violet light exposure, and slipperiness. The several compositions developed in the present invention are useful for converting polyurethanes into coatings as well as sealant compositions by a melt blending process. The first step includes the premixing of polyol(s) with the bituminous material already at its molten temperature to form a reagent mixture. The reagent mixture is carried separately from the isocyanate to the mixing head by heated hoses. At the mixing head, the reagent mixture and isocyanate are mixed. The polyurethane prepolymer forms as the reagent material and isocyanate mix. These materials are metered through a narrow metallic tube for sufficient molecular weight buildup and sprayed under pressure through a suitable spray apparatus.

Applications of the invention include the use of:

bituminous materials such as asphalt, polymer and rubber enriched performance grade asphalt, and coal tar;

new and recycled crumb rubber and synthetic rubber;

polyols such as PPG (polypropylene glycol), PEG (polyethylene glycol), POTMG (polyoxytetramethylene glycol), HTPD hydroxy terminated polybutadiene, castor oil, and vegetable oils of different molecular weight and functionality; and isocyanates such as polymeric MDI as well as other dimeric and polymeric isocyanates.

In each of the following examples, the products were prepared in a common related manner. The bituminous material was prepared by degrading and dissolving crumb tire rubber in hot mix asphalt and heated to at least the molten temperature of the asphalt. The crumb rubber content in the asphalt component was between zero and seventy-five percent (0–75%) by weight. The rubberized asphalt was preheated between 125° C. and 225° C. in a separate vessel and this mixture is called component A. The polyol, either single or in combination of more than one, was catalyzed preferably with dibutyltin dilaurate (1–5% of the polyol weight) with constant stirring in a separate vessel and is called component B. The isocyanate (dimeric and polymeric either alone or in combination) was placed in another separate vessel and is called component C. All three components were metered at varying compositions, mixed immediately before spraying, and the resultant composition sprayed onto different substrates. The substrate may be any type of concrete, wood, metal, rubber, asphalt, or other commonly used roofing material.

EXAMPLE 1

Components B and C were mixed to form the polyurethane prepolymer, and the resultant composition was then mixed with component A in situ and then sprayed on a pre-fabricated aluminum dye at different thicknesses (e.g. 2 mm, 4 mm, 6 mm, etc.). The resulting bituminous polyurethane interpenetrating elastomeric network composition was then allowed to cure for twenty-four hours at 25° C. and post-cured for five days at 25° C. All the samples were die cut for different test specimens. The viscosity, stress-strain properties, and other physical and mechanical properties should be tested in accordance with procedures set forth in ASTM D 412.

EXAMPLE 2

By the same procedure, rubberized asphalt made from rubber sources, was used including virgin rubbers (styrene-butadiene rubbers, butadiene rubbers, butyl rubbers, ethylene-propylenen-diene monomer (EPDM) rubber, natural rubber, rubber made from other block copolymers and polymers of similar nature) and waste rubbers from other resources including off-specification rubbers and off-specification compounds from compounding operations.

EXAMPLE 3

By the same procedure as Example 1, the component B was substituted with other polyols, polyester polyols of different types and different molecular weight, polyether polyols of different types and different molecular weights, polyol substitutes from vegetable oils such as castor oils and oils of similar nature. These components were either used alone or in combination with each other.

EXAMPLE 4

By the same procedure as Example 1, the component C was substituted with other di and/or polyisocyanates.

EXAMPLE 5

By the same procedure as Example 1, the catalyst was substituted with others.

EXAMPLE 6

By the same procedure as Example 1, the different ratios of components B with components C are tested.

EXAMPLE 7

By the same procedure as Example 1, the reactions were tested at different temperatures.

EXAMPLE 8

By the same procedure as Example 1, the reactions were carried out in different residence time (reaction time) and the materials tested for their physical and mechanical properties.

EXAMPLE 9

By the same procedure as Example 1, the coating is applied in sequence to study the colorability, and compatibility is tested.

EXAMPLE 10

Several selected formulations were sprayed on several substrates, including wood, metals, concrete, bricks, rubbers, asphalt binders, and substrates of similar nature. The adhesion between these coatings and these substrates is measured by measuring the peel strength.

A series of controlled experiments were conducted to determine the effect of varying the formulation of the composition. The results of these experiments are listed in FIGS. 3, 4, and 5. In these experiments, unless specifically stated, the following methods were used. First, a required amount of asphalt was placed in a one quart (1 qt) tin container. The container was placed in an electric heating mantel. The desired temperature was maintained using a controller having an accuracy of plus or minus three degrees Fahrenheit (+/−3° F.). The temperature of the liquid contents in the container was monitored by a sensor immersed in the liquid asphalt mixture. The mixture was mixed using a stirrer. The stirrer utilized an overhead motor with a digital display of speed and torque. Torque was used to measure the viscosity of the mixture. The torque was monitored throughout the duration of the reaction. In the experiments, the polyol was preheated. If any curing agent or catalyst was included, they were added to the polyol. The polyol was then added to the asphalt and mixed for twenty minutes (20 min). The isocyanate was added gradually (1–3) seconds to the mixture. The gelation point was determined from the plot of time versus torque. Each experiment was repeated to verify the reproducability and accuracy of the results.

Polyols

The following polyols are applicable to this invention: polyether polyols, polyester polyols, hydroxyl terminated polybutadiene and their copolymer with acrylonitrile, cicinoleic triglyceride (commercially known as "castor oil"), and other vegetable oils of similar nature with different functionality and molecular weight.

A polyol which is particularly suited for use in the invention is polypropylene glycol, with the below specifications:

| | |
|---|---|
| Hydroxyl number mg/KOH/gm | 102–115 |
| Acid Number (Max.) | 0.04 to 0.05 |
| Unsaturation (meq/g, max.) | 0.025 to 0.028 |
| Functionality | 2 |
| Density lbs/gal @ 25° C. | 8.00–8.50 |
| Viscosity, CPS @ 25° C. | 75–80 |

The particular suppliers of this polyol include but are not limited to BASF Corporation, USA and Dow Chemical Company, USA.

Isocyanates

Isocyanates which can be utilized with this invention include diphenylmethane diisocyanates ("MDI"), toluene diisocyanates ("TDI"), hexamethylene diisocyantes (HMDI"), and isophorone diisocyantes ("IPDI") All of these have a functionality of two or greater.

An isocyanate which is particularly suited for use in this composition is MDI, with the below specifications:

| | |
|---|---|
| Appearance | Dark brown liquid |
| NCO content, wt % | 32–35 |
| Viscosity @ 25° C., cps | 70–75 |
| Flash point ° C. (COC) | >200° C. |
| Density @ 25° C., g/cm³ | 1.2–1.3 |

Suppliers of this isocyanate include but are not limited to BASF Corporation, USA and Dow Chemical Company, USA.

FIG. 3 shows the results from a series of controlled experiments that show the impact of varying the amount of isocyanate. Formulation 1 is a preferred embodiment containing ten percent (10%) by weight isocyanate. Formulation 6 contains only nine percent (9%) by weight of isocyanate. By reducing the amount of isocyanate, the gelation of the product can be controlled.

Catalyst

Catalysts applicable to this invention include dibutyltin dilaurate, dioctyltin dilaurate, different tertiary amines and organometallic compounds of tin, lead, cobalt, and zinc.

A catalyst which is particularly suited for use in this invention is dibutyltindilaurate ("Dabco T-12"), with the following specifications:

| | |
|---|---|
| Flash point ° C. (PMCC) | >100° C. |
| Viscosity @ 25° C., cps | 125 |
| Specific gravity at 25° C. | 1.05 |
| Water solubility | Soluble |
| Appearance | Oily liquid |
| Calculated OH Number, MgkOH/g | 0 |

A supplier of this catalyst is Air Products and Chemicals, USA.

FIG. 3 is a table of experimental results showing the effect of including a catalyst within the formulation. Formulation 1 is a preferred embodiment of the formulation and includes a trace amount of catalyst and four percent (4%) by weight of a curative agent. Formulation 1 produces an instantaneous induction time and a gelation time of fifty (50) seconds. Induction time is the time required for the viscosity of the formulation to begin increasing as a result of polymerization. Gelation time is the time required for the viscosity effectively to reach infinity. Formulation 2 demonstrates the effect of not including the catalyst: the induction time is sixty seconds and the viscosity of the formulation reaches a plateau after 210 seconds.

Curing agent

Curing agents applicable to this invention are those generally utilized with polyurethanes and specifically include the following: 3,5-dimethythio-2,6-toluenediamine, 3,5-dimethylthio-2,4-tolunediamine, hexamethylene diamine, and trimethylol propane. In addition, the invention includes those products sold under the following tradenames: ETHACURE-100 and ETHACURE-300 both available from Albermarle; and JEFFAMINE-400 available from Huntsman. Thus, curing agents which can be used with the present invention include polyoxy(methyl-1,2,-ethanediol), alpha-hyrdoxyomega-(2-aminomethylethoxy)-ether with 2-ethyl-2-(hydroxymethyl)-1,3-propanediol(3:1); diethyl-toluenediamine; di-(methylthio)toluenediamine; 1,6-hexamethylene diamine; trimethylol propane; 3,5-dimethylthio-2,6-toluenediamine; 3,5-dimethylthio-2,4-toluenediamine, and other di and poly functional amines.

FIG. 3 shows the results of a series of controlled experiments demonstrating the effect of curing agents. Formulation 1 shows a preferred embodiment of the invention. Formulation 3a, b, and c show the effect of increasing the curing agent from zero to six percent (0–6%) by weight. The inclusion of greater amounts of curing agent reduced both the induction time and the gelation time. However, above four percent (4%) curing agent, full gelation is never reached. From this result, the conclusion that the high concentrations of curing agent begin to interfere with the formation of high-molecular-weight polymers. Formulation 4 includes no catalyst and no curing agent. The result was a formulation having a delayed induction time and gelation time.

FIG. 4 is a table showing the effect on gelation time that the different curing agents create. For purposes of forming a waterproofing membrane, a gelation time of sixty (60) seconds is preferred. For other applications, different gelation times may be more desirable.

Bituminous Material

Bituminous materials are a broad class of carbon-rich materials that typically have a high penetration index number ("PIN"). Examples of bituminous materials include the numerous grades of asphalt, performance grade asphalt (also known as polymer modified asphalt), and coal tar. The bituminous material preferably has a penetration index number between 16 and 195.

Asphalts can be described by their penetration index numbers. While all asphalts are included in this invention, experiments were conducted on Type I, II, III, and IV asphalts having PINs ranging from 16 to 37.

Performance grade asphalts also can be described by their penetration index numbers. While all performance grade asphalts are included in this invention, experiments were conducted on the following types: 70/28, 64/28, 58/28, and 52/34 having PINs ranging from 65 to 195.

Hot mix asphalt is an asphalt that is heated up to certain temperatures so that certain additives can be incorporated into it, which creates a new composition. Preferably, the amount of rubberized asphalt in the invention is 40%–60% by weight.

Polymer modified asphalt is an asphalt that is modified with the integration of certain polymers, both virgin and recycled. Polymer modified asphalts improve the property, performance, and applications of asphalt.

Different kinds of polymers integrated into the asphalt may include polyethylenes, polypropylenes, polystyrenes, different block, graft, and random copolymers, virgin rubber, and rubber from crumb rubber.

Overall range of crumb rubber content of other polymer in the asphalt is zero to seventy percent (0–70%) by weight. The particular range (preferred range) used in this invention is between five and twenty-five percent (5–25%) by weight.

The polyol available for combinations in this invention are referenced above. The different combinations of polyols will be quantitatively premixed, in any combination, and calculated amounts of catalyst are mixed to optimize the various compositions in meeting the requirements of the particular application. The polyol used in one application of the invention is catalyzed polyol.

An example of the dibutyltindilaurate is sold under the trademark Dabco T-12 by Air Products and Chemicals, Pa, USA. Details of Dabco T-12 are contained in the attached Polyurethane Additives Product Bulletin which is incorporated by reference herein as though fully set forth herein. The preferred range used in this composition is from 0.001 to 0.05 percent by weight.

The preferred isocyanate used in this composition is MDI, generally described above. The isocyanate is preferably between five and twenty percent by weight of the composition.

A suitable rubberized asphalt used for this composition contains crumb rubber from recycled car and truck tires of particle sizes ranging between ten and eighty (10–80) mesh. A supplier of this material is Bitumar, Inc., Canada.

FIG. 3 depicts a series of controlled experiments that show the effect that the concentration of asphalt has on induction time and gelation time. As shown in Formulations 5a, 5b, and 1, as the concentration of asphalt increases the gelation time increases. The data also shows that regardless of the asphalt concentration, the induction time remains instantaneous.

FIG. 3 also shows the effect of temperature on the reaction. Formulation 5d was conducted at 100° F. while formulation 5c was conducted at 250° F. At the higher temperature, the product containing no asphalt never fully gelled. In contrast at 100° F., the formula gelled after only 15 seconds.

Figures 2, 5:
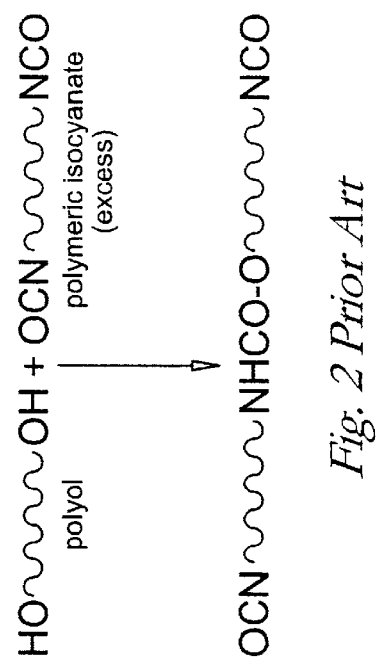
FIG. 2 is a prior-art chemical reaction depicting the formation of a typical polyurethane prepolymer from a polyol and diisocyanate.
FIG. 5 is a table summarizing a series of controlled experiments utilizing different bituminous materials.
Figure 6:
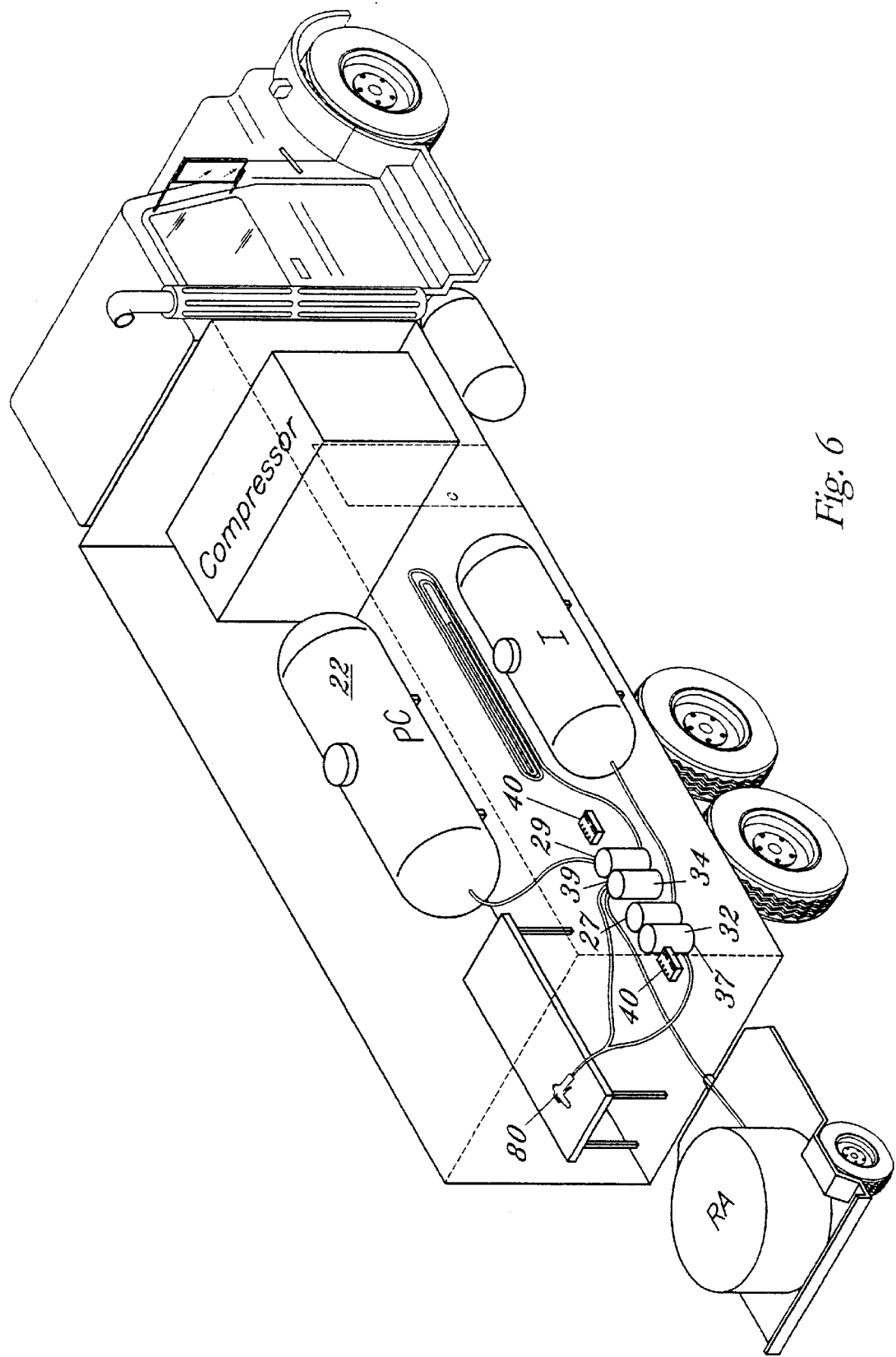
FIG. 6 is a perspective view of a mobile apparatus for the preparation of a bituminous polyurethane interpenetrating elastomeric network composition.

FIG. 5 shows the results from a series of controlled experiments wherein the type of asphalt is changed to demonstrate its effect on gelation time. By changing the type of asphalt, the gelation time can be controlled for different applications. Greater gelation times may be useful in applications such as adhesives. Partially gelled products can be used as elastomers for O-rings.

Application of Composition to Substrate

The procedure for application of the invention involves four steps: a) pumping; b) metering; c) polymerization; and d) spraying (collectively referred to as "Process"), shown schematically in FIG. 1.

(a) Pumping step

The raw materials, isocyanate ("I"), polyol ("P"), catalyst ("C"), and rubberized asphalt ("RA") are pumped or supplied to the mixing apparatus 20. P and C are premixed at mixer 22 and supplied together as one component ("PC"). I and RA are supplied as the other two components. PC, I, and RA are supplied directly from their containers through heated hoses 24, 26 and 28 connected to feed pumps 25, 27 and 29, respectively in varying amounts or ratios as governed by controller 40.

(b) Metering step

The raw materials as received into the mixing apparatus are regulated by computerized controller 40, flow meters measuring 30, 32 and 34 and thermocouples 35, 37 and 39 measuring the temperatures.

(c) Polymerization step

The raw materials RA, I and PC are supplied to the mixing apparatus 20 where the in situ polymerization reaction is initiated by mixing the materials intensely so that a three-dimensional, semi-interpenetrating network molecular structure formation begins. This reaction process continues while the mixture flows from the mixing chamber 20 to the conduit 50, where polymer propagation takes place without allowing complete cross-linking. The entire apparatus is preferably heated so as to accelerate the reaction rate and maintain the composition at the desired temperature. The resulting prepolymer is conveyed from the reaction chamber to the spraying device 80.

The preferred amount of polyurethane prepolymer in the invention is between thirty and fifty (30%–50%) by weight. It should be noted that the entire apparatus shown in FIG. 1 is preferably heated, including all supply lines and mixing chambers, so that the ingredients and resulting composition are maintained at a temperature in the range of 300° F.–340° F.

The preferred ratio of polyol/isocyanate to rubberized asphalt is 50:50. The preferred ratio of polyol to isocyanate is 80:20. The catalyst is 0.07% by weight of the polyol composition.

(d) Spraying step

The prepolymer 70 travels to the spraying device 80, where it is sprayed out of a nozzle and onto the surface or substrate S to be coated.

Varying the Compositions

Depending upon the application, required amounts of all of the raw materials will be processed through the above-described process and applied to the different substrates. The properties of the composition, nature of the substrates, application conditions, and other related factors determine the resulting coating.

The prepolymers created by this invention will have reactive isocyanate terminal groups and will cure with moisture and/or any molecules with active hydrogen atoms. The overall range of the polyurethane prepolymers is between ten and ninety percent (10%–90%) by weight.

In one embodiment the bituminous polyurethane interpenetrating elastomeric network composition can include: (a) fifty percent by weight of rubberized asphalt having a penetration index number of 30; (b) thirty-six percent by weight of polyether polyol; (c) four percent by weight of a blend consisting of 3,5-dimethylthio-2,6-toluenediamine and 3,5-dimethylthio-2,4-toluenediamine; (d) a trace amount of dibutyltin dilaurate; and (e) ten percent by weight of polymeric MDI.

The instant invention that has been shown and described herein is considered to be the most practical and preferred embodiment. It is recognized, however, that departures may be made therefrom within the scope of the invention and that obvious modifications will occur to a person skilled in the art.

What is claimed is:

1. A bituminous polyurethane interpenetrating elastomeric composition comprising:

a bituminous material including rubber modified oxidized asphalt, a polyol, a curing agent chosen from a group consisting of polyoxy (methyl-1,2,-ethanediol), alpha-hyrdoxyomega-(2-aminomethylethoxy)-ether with 2-ethyl-2-(hydroxymethyl)-1,3-propanediol(3:1); diethyltoluenediamine; di-(methylthio)toluenediamine; 1,6-hexamethylene diamine; trimethyxlol propane; 3,5-dimethylthio-2,6-toluenediamine; 3,5-dimethylthio-2,4-toluenediamine; and an isocyanate;

wherein the curing agent is added to the polyol to form a polyol blend as a reagent mixture, then the polyol blend is mixed with hot melt rubberized asphalt; wherein the mixture of said rubberized asphalt and the polyol blend reacts with said isocyanate by in situ polymerization.

2. The composition as described in claim 1, wherein said bituminous material is between five and seventy-five percent by weight of said composition.

3. The composition as described in claim 1 wherein said bituminous material including an oxidized asphalt has a penetration index number between 16 and 195.

4. The composition as described in claim 1, wherein said rubberized asphalt containing a polymer chosen from the group consisting of polyethylene, polypropylene, polystyrene, virgin rubber, and crumb rubber.

5. The composition as described in claim 4, wherein said polymer comprises between five and seventy percent by weight of said rubberized asphalt.

6. The composition as described in claim 1, wherein said polyol blend is between forty and seventy-two percent by weight of said composition.

7. The composition as described in claim 1, wherein said polyol is chosen from the groups consisting of polypropylene glycol, polyether polyol, polyester polyol, hydroxyl terminated polybutadiene, copolymer containing acrylonitrile, cicinoleic triglyceride, and vegetable oil.

8. The composition as described in claim 1, wherein said isocyanate is between five and twenty percent by weight of said composition.

9. The composition as described in claim 1, wherein said isocyanate is chosen from the group consisting of diphenylmethane diisocyanate, toluene diisocyanate, hexamethylene diisocyanate, and isophorone diisocyanate.

10. The composition as described in claim 1, wherein said curing agent is between two and eight percent by weight of said composition.

11. The composition as described in claim 1, wherein said curing agent is chosen from the group consisting of polyoxy (methyl-1,2,-ethanediol), alpha-hyrdoxyomega-(2-aminomethylethoxy)-ether with 2-ethyl-2-(hydroxymethyl)-1,3-propanediol(3:1); diethyltoluenediamine; di-(methylthio)toluenediamine; 1,6-hexamethylene diamine; trimethylol propane; 3,5-dimethylthio-2,6-toluenediamine; 3,5-dimethylthio-2,4-toluenediamine.

12. The composition as described in claim 1, further comprising a catalyst.

13. The composition as described in claim 12, wherein the amount of said catalyst is trace.

14. The composition as described in claim 12, wherein the amount of catalyst is between one and five percent by weight of said polyol.

15. The composition as described in claim 12, wherein said catalyst is chosen from the group consisting of dibutyltin dilaurate, dioctyltin dilaurate, tertiary amine, and organometallic compounds of tin, organometallic compounds of lead, organometallic compounds of cobalt, and organometallic compounds of zinc.

16. A bituminous polyurethane interpenetrating elastomeric network composition comprising:
fifty percent by weight of rubberized asphalt having a penetration index number of 30,
thirty-six percent by weight of polyether polyol,
four percent by weight of a curing agent blend consisting of 3,5-dimethylthio-2,6-toluenediamine and 3,5-dimethylthio-2,4-toluenediamine,
a less than one percent amount of dibutyltin dilaurate, and
ten percent by weight of diphenylmethane diisocyanate.

17. An in situ polymerization method of preparing a bituminous polyurethane interpenetrating elastomeric network composition comprising a bituminous material including rubber modified oxidized asphalt, a polyol blend having a polyol and a curing agent blend consisting of 3,5-dimethylthio-2,6-toluenediamine and 3,5-dimethylthio-2,4-toluenediamine, and an isocyanate; said method comprising the steps of:
heating said bituminous material in a first container at least to its molten temperature,
providing said polyol blend in a second container,
mixing said heated bituminous material and said polyol blend together to form a reagent mixture, and
adding said isocyanate to said reagent mixture immediately before application to a surface to form in situ said bituminous polyurethane interpenetrating elastomeric network composition.

18. The method described in claim 17 further comprising adding a catalyst to said polyol blend of said polyol and curing agent before mixing with said rubberized asphalt.

19. The method described in claim 17 further comprising spraying said bituminous polyurethane interpenetrating elastomeric network composition as a thermoset membrane or as a sealant onto a substrate after mixing said isocyanate with said reagent mixture.

20. The method as described in claim 17 further comprising:
adjusting the composition to adjust the gelation time.

21. The method as described in claim 17 further comprising:
adjusting the composition to adjust the induction time.

22. The method described in claim 17 wherein said rubberized asphalt is heated to a temperature between 125° C. and 225° C.

23. A bituminous polyurethane interpenetrating elastomeric network composition comprising a rubberized oxidized asphalt, a polyol, an asphalt soluble curing agent and an isocyanate; said curing agent chosen from a group consisting of polyoxly(methyl-1,2,-ethanediol), alpha-hyrdoxyomega-(2-aminomethylethoxy)-ether with 2-ethyl-2-(hydroxmethyl)-1,3-propanediol (3:1); diethyltoluenediamine; di-(methylthio)toluenediamine; 1,6-hexamethylene diamine; trimethylol propane; 3,5-dimethylthio-2,6-toluenediamine; 3,5-dimethylthio-2,4-toluenediamine; said composition made through a method comprising the steps of:
heating said rubberized oxidized asphalt in a first container at least to its molten temperature,
mixing said polyol having said asphalt soluble curing agent added thereto to form a polyol blend in a second container,
mixing said rubberized oxidized asphalt and said polyol blend together to form a reagent mixture, and
adding said isocyanate to said reagent mixture immediately before application to a surface to provide for an in situ formation of said solventless bituminous polyurethane interpenetrating elastomeric network composition.

24. A method of preparing a bituminous polyurethane interpenetrating elastomeric network composition comprising a rubberized asphalt, a polyol blend of polyol and a curing agent, and an isocyanate; said method comprising:
(a) heating a rubber mix to at least molten temperature of the asphalt;
(b) adding an aromatic curing agent as a compatabilizer for the asphalt and polyol and to achieve faster curation time, said curing agent chosen from a group consisting of polyoxy(methyl-1,2,-ethanediol), alpha-hyrdoxyomega-(2-aminomethylethoxy)-ether with 2-ethyl-2-(hydroxymethyl)-1,3-propanediol(3:1); diethyltoluenediamine; di-(methylthio)toluenediamine; 1,6-hexamethylene diamine; trimethylol propane; 3,5-dimethyltio-2,6-toluenediamine; 3,5-dimethylthio-2,4-toluenediamine;
(c) adding a catalyst to the polyol to accelerate the polyurethane formation kinetics; and
(d) mixing an isocyanate with the heated rubberized asphalt and polyol immediately before spray application of the composition on substrates;
wherein said catalyst, said rubberized asphalt, the polyol and said isocyanate form a formulation having an induction time ranging from approximately one to four hundred twenty seconds and a gelation time ranging from approximately thirty to four hundred ninety five seconds.

25. A bituminous polyurethane interpenetrating elastomeric composition comprising:
a hot melt crumb rubber modified oxidized asphalt,
a polyol,
an isocyanate; and
a curing agent for allowing the composition of crumb rubber modified oxidized rubberized asphalt, polyol and isocyanate to cure;
wherein said crumb rubber modified oxidized asphalt increases the polarity of the asphalt for increased compatibility and reaction between the asphalt and said isocyanate;
wherein said curing agent is added to said polyol to form a polyol blend prior to mixing said polyol blend with said hot melt crumb rubber modified oxidized asphalt; wherein the mixing of said polyol blend with said crumb rubber modified oxidized asphalt yields a reagent mixture; wherein said reagent mixture is mixed with the isocyanate through an in Situ polymerization reaction; wherein said catalyst, said rubberized modified oxidized asphalt, the polyol and said isocyanate form a formulation having an induction time ranging from approximately one to four hundred twenty seconds and a gelation time ranging from approximately thirty to four hundred ninety five seconds;
wherein said curing agent is chosen from the group consisting of polyoxy(methyl-1,2,-ethanediol), alpha-hyrdoxyomega-(2-aminomethylethoxy)-ether with 2-ethyl-2-(hydroxymethyl)-1,3-propanediol(3:1); diethyltoluenediamine; di-(methylthio)toluenediamine; 1,6-hexamethylene diamine; trimethylol propane; 3,5-dimethylthio-2,6-toluenediamine; 3,5-dimethylthio-2, 4-toluenediamine.

* * * * *